United States Patent
Kim et al.

(10) Patent No.: US 8,268,474 B2
(45) Date of Patent: *Sep. 18, 2012

(54) BATTERY MODULE WITH CELL BARRIER BETWEEN UNIT CELLS AND HAVING BENDING ELEMENT

(75) Inventors: Tae-Yong Kim, Yongin-si (KR);
Sang-Won Byun, Yongin-si (KR);
Yoon-Cheol Jeon, Yongin-si (KR);
Gun-Goo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,864

(22) Filed: May 18, 2011

(65) Prior Publication Data
US 2011/0223462 A1 Sep. 15, 2011

Related U.S. Application Data

(63) Continuation of application No. 11/501,603, filed on Aug. 8, 2006, now Pat. No. 7,981,538.

(30) Foreign Application Priority Data

Aug. 10, 2005 (KR) .................. 10-2005-0073268
Dec. 21, 2005 (KR) .................. 10-2005-0127190

(51) Int. Cl.
*H01M 6/42* (2006.01)
*H01M 10/50* (2006.01)

(52) U.S. Cl. ......... 429/149; 429/420; 429/153; 429/154

(58) Field of Classification Search .................. 429/149, 429/120, 82, 152, 154, 156, 151, 157, 153
See application file for complete search history.

(56) References Cited

U.S. PATENT DOCUMENTS

| 4,346,150 A | 8/1982 | Bellows et al. |
| 6,130,003 A | 10/2000 | Etoh et al. |
| 6,479,185 B1 * | 11/2002 | Hilderbrand et al. ......... 429/148 |

(Continued)

FOREIGN PATENT DOCUMENTS

CN 1178398 A 4/1998

(Continued)

OTHER PUBLICATIONS

European Search Report dated Sep. 29, 2011, for corresponding European Patent application 06118731.6, noting listed references in this IDS, as well as others previously submitted in an IDS dated May 18, 2011, 5 pages.

(Continued)

*Primary Examiner* — Raymond Alejandro
(74) *Attorney, Agent, or Firm* — Christie, Parker & Hale, LLP

(57) ABSTRACT

A battery module, including a plurality of unit cells and a cell barrier interposed between the unit cells, is provided. The cell barrier includes a body member extending in a direction and at least partially covering a first outer surface of an adjacent unit cell, the body member having an opening extending in the direction, and a bending element extending from a side of the body member in another direction and at least partially enclosing a second outer surface of the adjacent unit cell, the bending element having an opening extending in the another direction.

16 Claims, 10 Drawing Sheets

U.S. PATENT DOCUMENTS

| | | | |
|---|---|---|---|
| 7,981,538 B2 * | 7/2011 | Kim et al. | 429/149 |
| 2003/0193313 A1 | 10/2003 | Takedomi et al. | |
| 2005/0164080 A1 | 7/2005 | Kozu et al. | |
| 2006/0028170 A1 * | 2/2006 | Izawa | 320/107 |

FOREIGN PATENT DOCUMENTS

| | | | |
|---|---|---|---|
| CN | 1227002 | | 8/1999 |
| JP | 2002-042753 | | 2/2002 |
| JP | 2002-100392 | | 4/2002 |
| JP | 2002-157982 | * | 5/2002 |
| JP | 2003-007355 | | 1/2003 |
| JP | 2003-323871 | | 11/2003 |
| KR | 10-2005-0106540 | | 11/2005 |
| WO | WO 01/75989 A2 | | 10/2001 |
| WO | WO 2005/036679 A1 | | 4/2005 |
| WO | WO 2006/009062 A1 | | 1/2006 |
| WO | WO 2006/101342 A1 | | 9/2006 |

OTHER PUBLICATIONS

Japanese Office Action dated Feb. 2, 2010, for corresponding Japanese application 2006-214532.

European Search Report, dated Oct. 30, 2007, for European Application No. EP 06 11 8731, in the name of Samsung SDI Co., Ltd.

English abstract for EP Publication No. EP 0918358, which corresponds to CN 1227002 listed above.

* cited by examiner

BATTERY MODULE WITH CELL BARRIER BETWEEN UNIT CELLS AND HAVING BENDING ELEMENT

CROSS-REFERENCE TO RELATED APPLICATIONS

This application is a continuation of U.S. patent application Ser. No. 11/501,603, filed on Aug. 8, 2006 and issued as U.S. Pat. No. 7,981,538 on Jul. 19, 2011, which claims the benefit of Korean Patent Application No. 10-2005-0073268 filed in the Korean Intellectual Property Office on Aug. 10, 2005, and Korean Patent Application No. 10-2005-0127190 filed in the Korean Intellectual Property Office on Dec. 21, 2005, the entire contents of all of which are incorporated herein by reference.

BACKGROUND OF THE INVENTION (a) Field of the Invention

The present invention relates to a battery module, and more particularly, to a rechargeable battery module having an improved cell barrier between unit cells.

(b) Description of the Related Art

A rechargeable battery module typically includes rechargeable batteries (also known as unit cells) connected in series.

The unit cells respectively include an electrode assembly, which is composed of positive and negative electrodes and a separator interposed therebetween, a case having a space for housing the electrode assembly, and a cap assembly combined with the case and sealing it.

The cap assembly may include positive and negative terminals disposed inside and outside of the case and electrically connected with the positive and negative electrodes. When the unit cell is prismatic, it forms a battery module by alternatingly arranging positive and negative terminals protruding from the top of the unit cell with those of another adjacent unit cell. A connector of a conductor is typically mounted by a nut to electrically connect positive and negative terminals having partially threaded circumferential surface. Unit cells are thereby electrically connected to each other to constitute a battery module.

Since the typical battery module includes several to tens of unit cells, it needs to effectively dissipate the heat generated from each unit cell. Particularly, when it is formed as a rechargeable battery with large capacity for a motor-driven device such as an electric cleaner, an electric scooter, or an automobile (for example, an electric vehicle or a hybrid electric automobile), the heat dissipation becomes very significant.

If a rechargeable battery module does not dissipate the heat well, it can be over-heated due to the heat generated from each unit cell and thereby cause misoperation of the device to which the rechargeable battery module is applied.

Since conventional battery modules have a cell barrier disposed between unit cells and tightly contact the surfaces of the unit cells and a coolant flows through the inside of the cell barrier to cool down the unit cells, heat transferring efficiency can be low.

In addition, when an external impact is applied to a device where the battery module is housed or the device is vibrated during operation, the unit cells or the cell barrier may move within the battery module. When the unit cells are moved, contact resistance is increased between a conductor which electrically connects the unit cells and electrode terminals. When the cell barrier is moved, the flow of the coolant is disturbed and thus the cooling performance may be deteriorated.

Further, when the cell barrier has a complicated shape, it becomes difficult to easily fabricate the battery module, which leads to expensive production costs. Therefore, the structure of the cell barrier needs to be simplified to reduce the production cost.

SUMMARY OF THE INVENTION

In accordance with the present invention a rechargeable battery module is provided which has an improved unit cell cooling performance, a structure that can be easily fabricated, and a cell barrier fixed stably.

In an exemplary embodiment a battery module includes a plurality of unit cells and a plurality of cell barriers. Each cell barrier is adjacent to a respective unit cell. Each cell barrier includes a body member and a fixing part disposed on at least one edge of the body member. The fixing part is connectable to a corresponding fixing part on an adjacent cell barrier. The body member and the at least one fixing part mount the respective unit cell between the body member and the at least one fixing part.

The fixing part may include a fixing protrusion protruding from the body member and a fixing groove recessed in the body member. The fixing protrusion may be press-fittable into a corresponding fixing groove formed in the adjacent body member.

The fixing groove may have a shape corresponding to a shape of the fixing protrusion.

The fixing protrusion may include a support leg for seating the respective unit cell.

The fixing protrusion may be formed in one or more corners of the body member.

A corresponding fixing groove may be formed in a same corner as a fixing protrusion.

The fixing protrusion and the fixing groove of an adjacent cell barrier may interlock.

The cell barrier may include at least one bending element formed by bending an edge of the body member.

The at least one bending element may be formed on opposing edges of the body member, and a fixing protrusion may be formed in each bending element.

The fixing protrusion may be formed in both ends of the bending element.

The bending element may be adapted to tightly contact a side of the respective unit cell being absent external terminals.

The cell barrier may further include a supporting part protruding from an edge of the body member adjacent an edge having a fixing protrusion, the supporting part being adapted to tightly contact an adjacent unit cell.

The supporting part and the bending element may be perpendicular to each other.

The body member of the cell barrier may include an opening through which a coolant flows. The opening may be formed along a width direction of the body member.

The unit cells may be of a prismatic shape.

The body member may be a plate.

In accordance with another exemplary embodiment, a battery module includes a plurality of unit cells and a plurality of cell barriers, each cell barrier being adjacent to a respective unit cell, each cell barrier including a body member having an opening through which a coolant can flow and a bending element formed by bending at least one edge of the body member.

The opening may extend from the bending element at one end of the body member to an other end of the body member distal from the one end.

The bending element may be formed on opposing edges of the body member.

The bending element may tightly contact opposing sides of the unit cells being absent external terminals.

The opening may extend from the bending element at one end of the body member to a bending element at an other end of the body member.

The body member may have a support leg extending between opposing edges of the body member to support the respective unit cell.

The opening may penetrate the body member, may have a rectangular shape, and may be formed in a groove.

In yet another exemplary embodiment a method of interconnecting cell barriers located between unit cells of a battery module is provided. Each cell barrier is formed to include a body member. A fixing protrusion is formed protruding from the body member, the fixing protrusion being located on at least one edge of the body member. A fixing groove is recessed in the body member, the fixing protrusion being press-fittable into a corresponding fixing groove formed a body member of an adjacent cell barrier. The fixing protrusion and the corresponding fixing groove of the adjacent cell barrier interlock.

DETAILED DESCRIPTION

Figure 1:
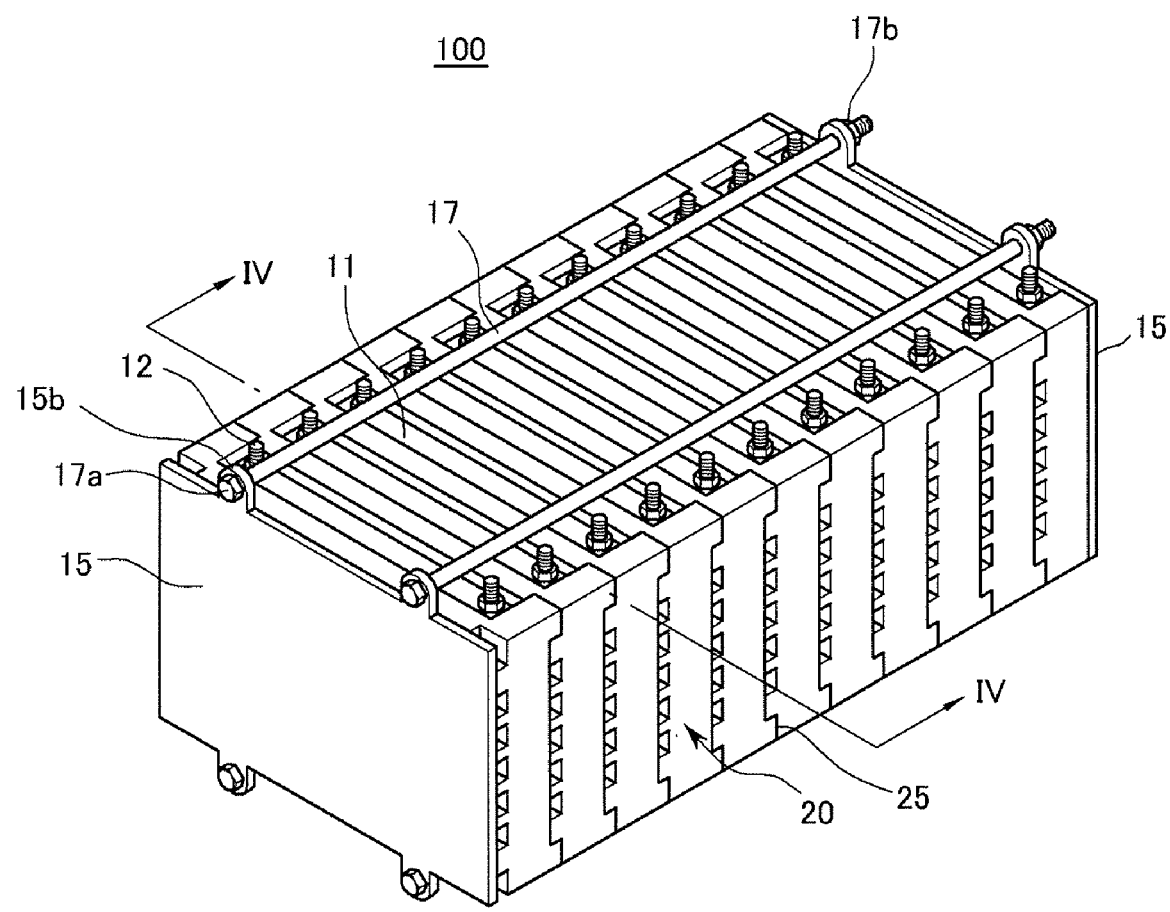
FIG. 1 is a perspective view showing a battery module in accordance with a first embodiment of the present invention.
Figure 2:
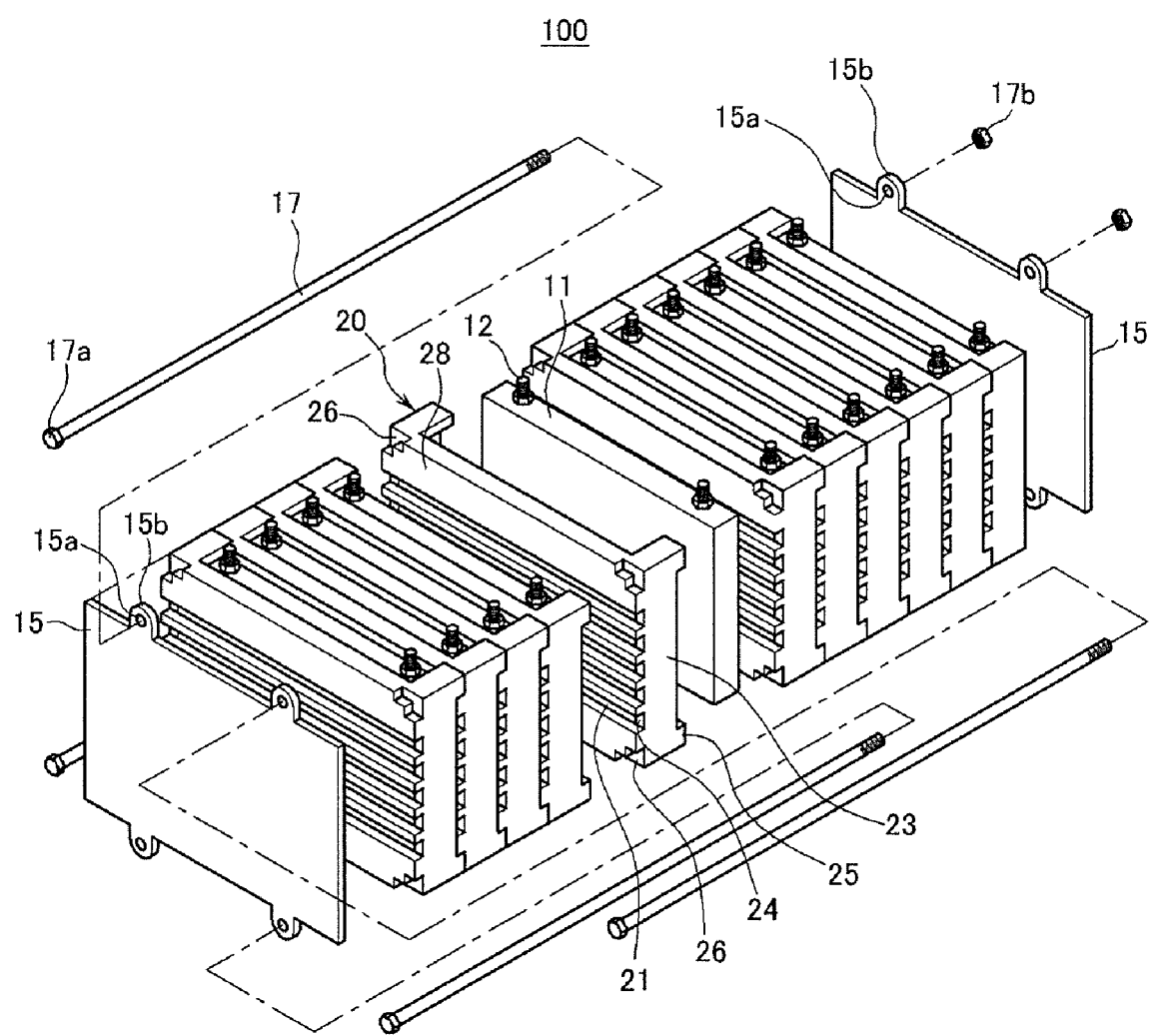
FIG. 2 is an exploded perspective view illustrating the battery module of FIG. 1.
Figure 3:
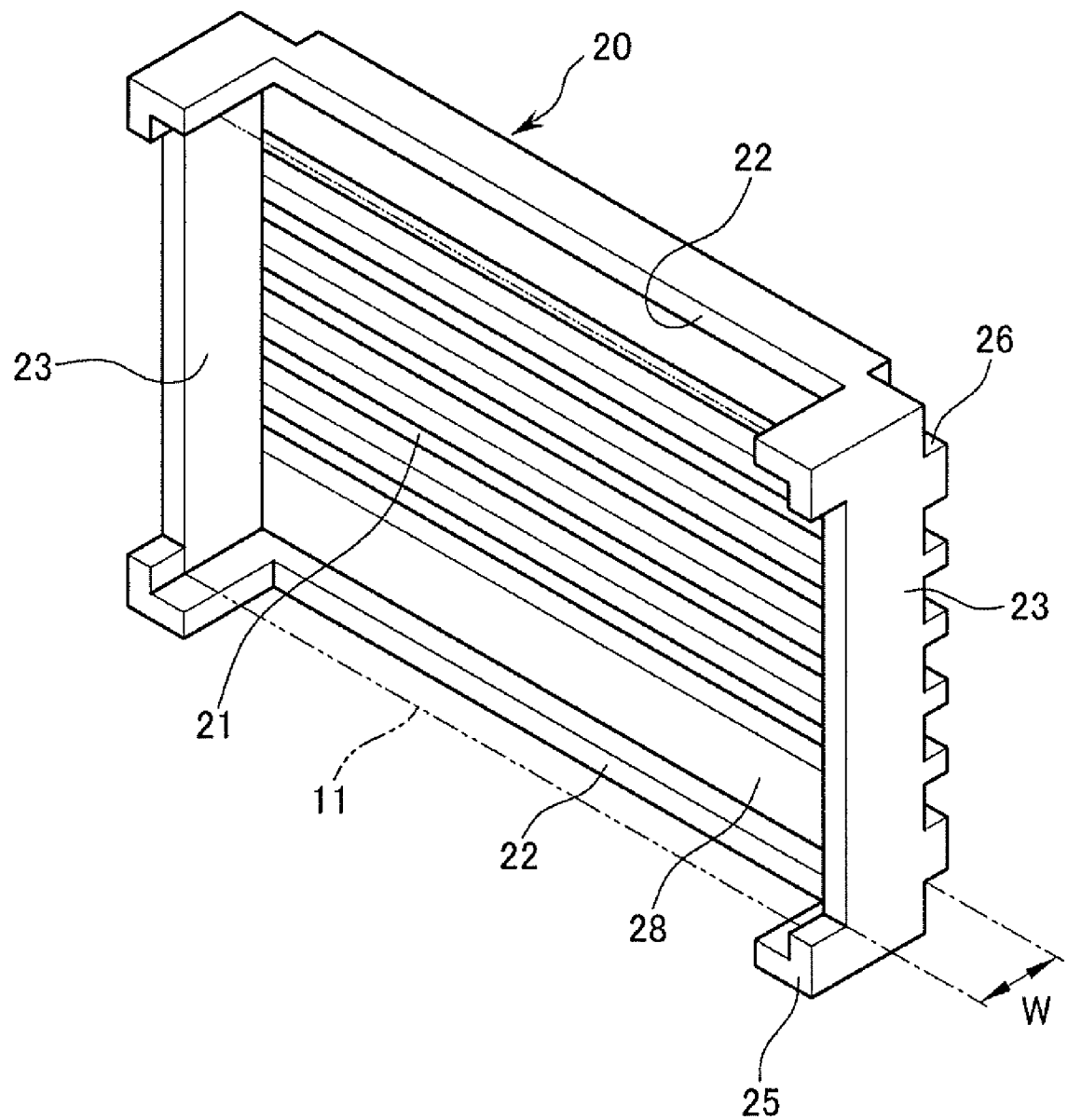
FIG. 3 is a perspective view showing a cell barrier of FIG. 2.

Referring now to FIGS. 1, 2 and 3, battery module 100 includes a plurality of unit cells 11 and a cell barrier 20 which is disposed between the unit cells and provides a coolant flow path.

In the following embodiments, the shape of the unit cells 11 is shown as being prismatic. However, the present invention is not limited to a prismatic shape of unit cells. The principles of the present invention may be applied to other diverse forms of unit cells, including unit cells having a cylindrical shape.

Each unit cell 11 is a rechargeable battery of a conventional structure which includes an electrode assembly in a case. The electrode assembly includes a positive electrode, a negative electrode, and a separator interposed between the two electrodes.

The cell barrier 20 is disposed between the unit cells 11 and forms both a path through which the coolant flows and spaces the unit cells 11 apart from each other.

A pair of end plates 15 are disposed in the outermost sides of the unit cells 11 arranged in a stack to apply pressure toward the center of the stack of unit cells 11.

A connecting member 17 connects the end plates 15 to each other to fix the end plates 15 and apply pressure to the unit cells 11. The connecting member 17 is inserted into a connection opening 15a formed in the end plates 15 and gets fixed onto the end plates 15.

The connection opening 15a is formed on ears 15b which protrude from an end of the connecting member 17 at a predetermined distance. When the connecting member 17 is inserted into the connection opening 15a, a flange 17a formed in one end of the connecting member 17 is caught by the ear 15b to be fixed and the other end of the connecting member 17 is combined with a screw nut 17b.

For the screw connection, the other end of the connecting member 17 includes a screw thread formed therein, and the screw nut 17b is combined with the other end of the connecting member 17 to be fixed while tightly contacting the ear 15b.

The end plates 15 fixes the unit cells 11 by being connected with the connecting member 17.

The cell barrier 20 includes a body member, such as plate member 28 having openings 21, and bending elements 23 and supporting elements 22 disposed on the plate members 28.

The plate member 28 includes at least one opening 21 into the coolant path on the surface. The opening 21 penetrates the plate member 28 to have the coolant directly contact the unit cells 11.

A plurality of openings 21 are formed, and both ends of each opening 21 are connected to grooves 24 formed in both bending elements 23 at both ends of the plate member 28.

Those skilled in the art would appreciate that if the unit cells have a cylindrical shape, the body member of such an embodiment of the present invention applicable to a cylindrical unit cell would be a curved member rather than being a plate member.

FIG. 2 shows a plurality of openings 21 formed along the width of the plate member 28. However, other embodiments may include at least one opening 21 and may have various shapes and arrangements of the openings.

Openings 21 are formed across the plate member 28 of the cell barrier 20 disposed between the unit cells 11 and the coolant may flow through the openings 21. The coolant can efficiently cool down the unit cells 11 by directly contacting neighboring unit cells 11 on both sides. The width of the space between the openings 21 may be freely adjusted as needed. The closer the openings 21 are arranged, the higher the heat transferring efficiency becomes due to increased heat transferring area.

FIG. 3 shows the bending elements formed in both ends of the plate member 28. Bending elements 23 are disposed on both confronting edges of the plate member 28 to tightly contact both sides of the unit cells 11, when the unit cells 11 are arranged to have their external terminals 12 of the unit cells 11 come on top of the unit cells 11. Herein, the bending elements 23 have a width (W) corresponding to the thickness of the unit cells 11.

When the battery module 100 is formed, the ends of the bending elements 23 tightly contact the cell barrier 20 disposed between neighboring unit cells 11, and a unit cell 11 between cell barriers 20 is stably fixed in place.

The ends of the bending elements 23 include a fixing part which is press-fit into a neighboring cell barrier 20. The fixing part is a fixing protrusion 25, which protrudes toward the neighboring cell barrier 20. The fixing protrusion 25 is formed in upper and lower ends of the bending elements 23, and the fixing protrusion 25 bends toward the inside of the cell barrier 20.

A fixing groove 26 is formed in one side of the plate member 28 opposite to the fixing protrusion 25. The fixing groove 26 has a recess corresponding to the fixing protrusion 25 such that the fixing groove 26 engages with a fixing protrusion 25 of an adjacent cell barrier.

The fixing groove 26 has four angular points where edges of the plate member 28 meet.

Also, the cell barrier 20 includes supporting parts 22 supporting the upper side of the unit cells 11 where the external terminals 12 are formed and the lower side of the unit cells 11, which is opposite the upper side. The supporting parts 22 protrude in the same direction as the bending elements 23 are bent, and they extend from the bending element 23 on one side to the bending element 23 on the other side.

Since the cell barrier 20 includes the bending elements 23 supporting the unit cells 11 in the right and left sides and the supporting parts 22 supporting the unit cells 11 from the upper and lower sides, it can easily support the unit cells 11.

Figure 4:
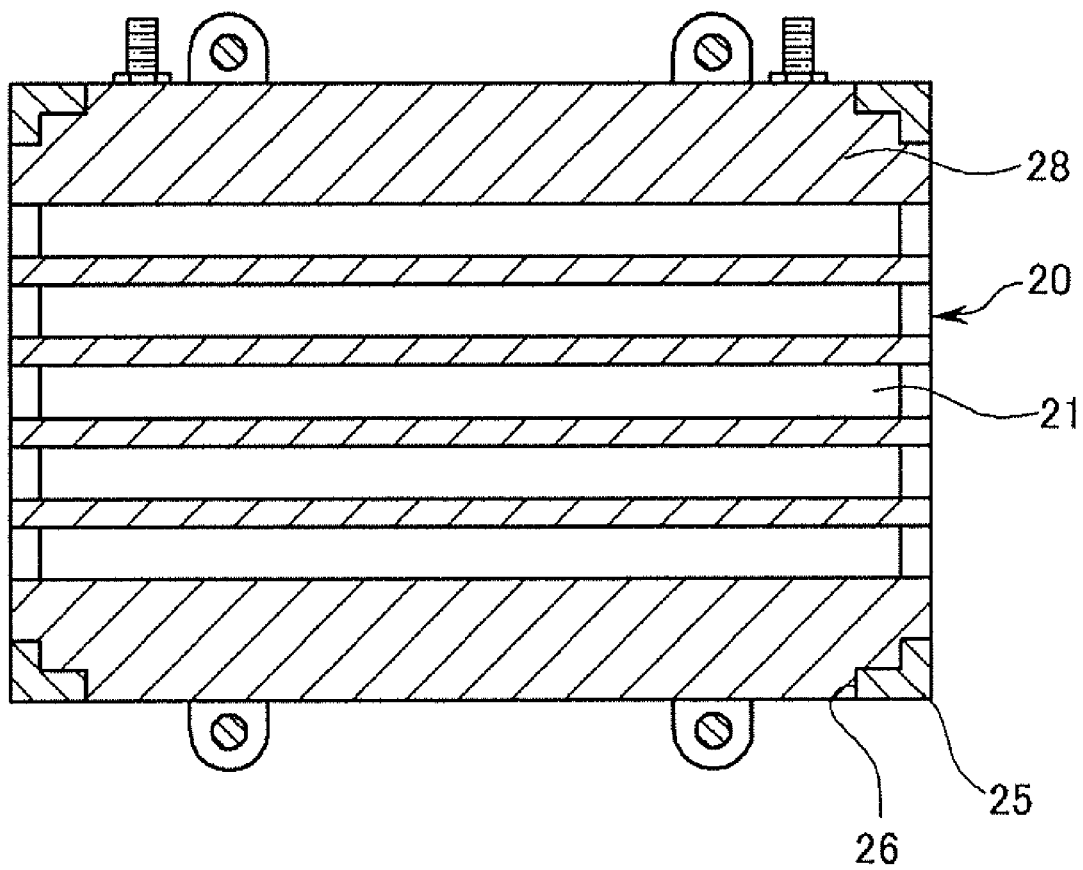
FIG. 4 is a cross-sectional view showing the battery module of FIG. 1 cut along a IV-IV line.

As illustrated in FIG. 4, neighboring cell barriers 20 get fixed when the fixing protrusion 25 of one cell barrier 20 is engaged with the fixing groove 26 of another adjacent cell barrier 20.

Since four fixing protrusions 25 at the corners of a cell barrier 20 support the cell barrier 20 so as not to slip out at one side, the cell barrier 20 can be fixed stably.

Figure 5:
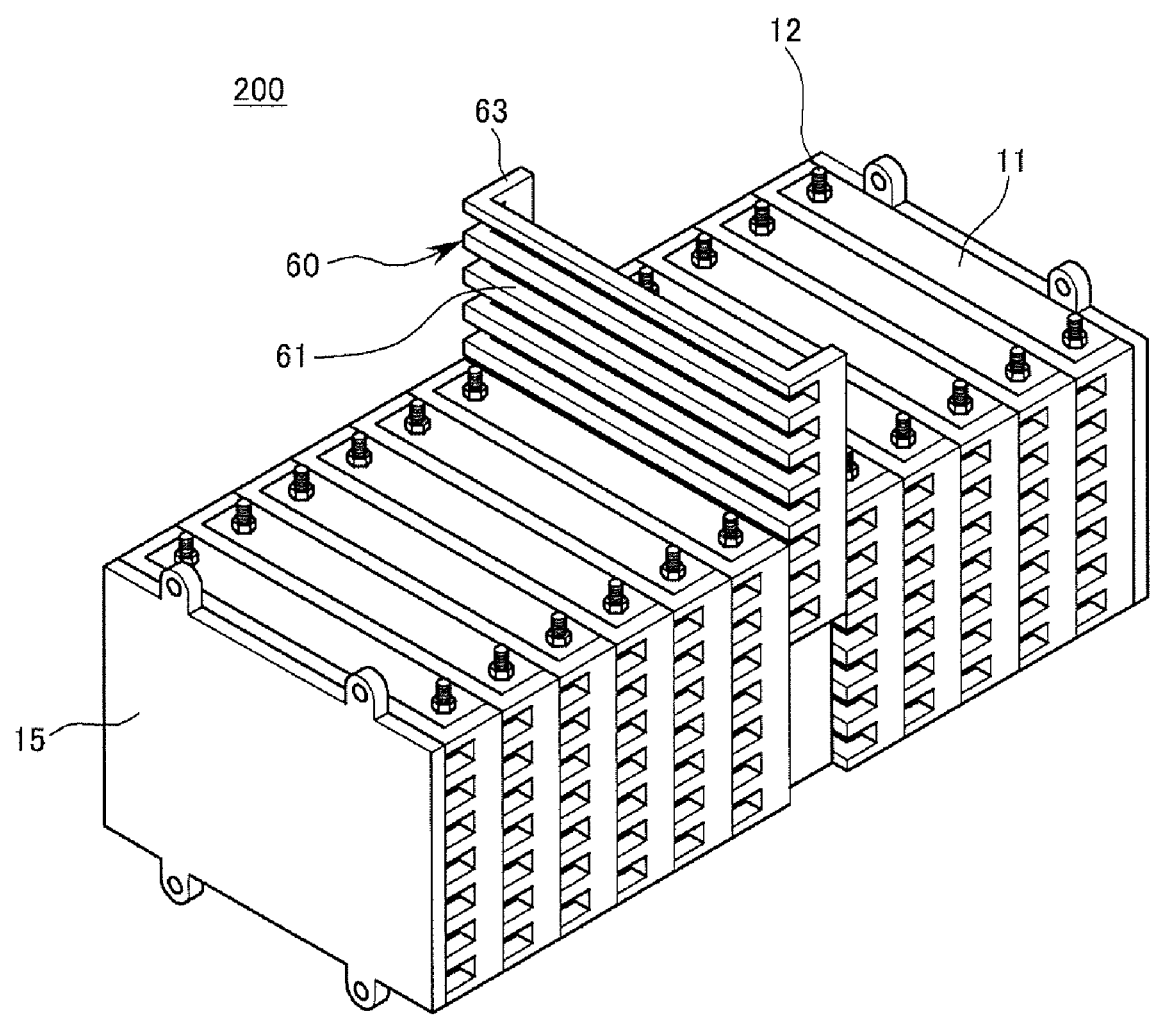
FIG. 5 is a perspective view illustrating a battery module in accordance with a second embodiment of the present invention.
Figure 6:
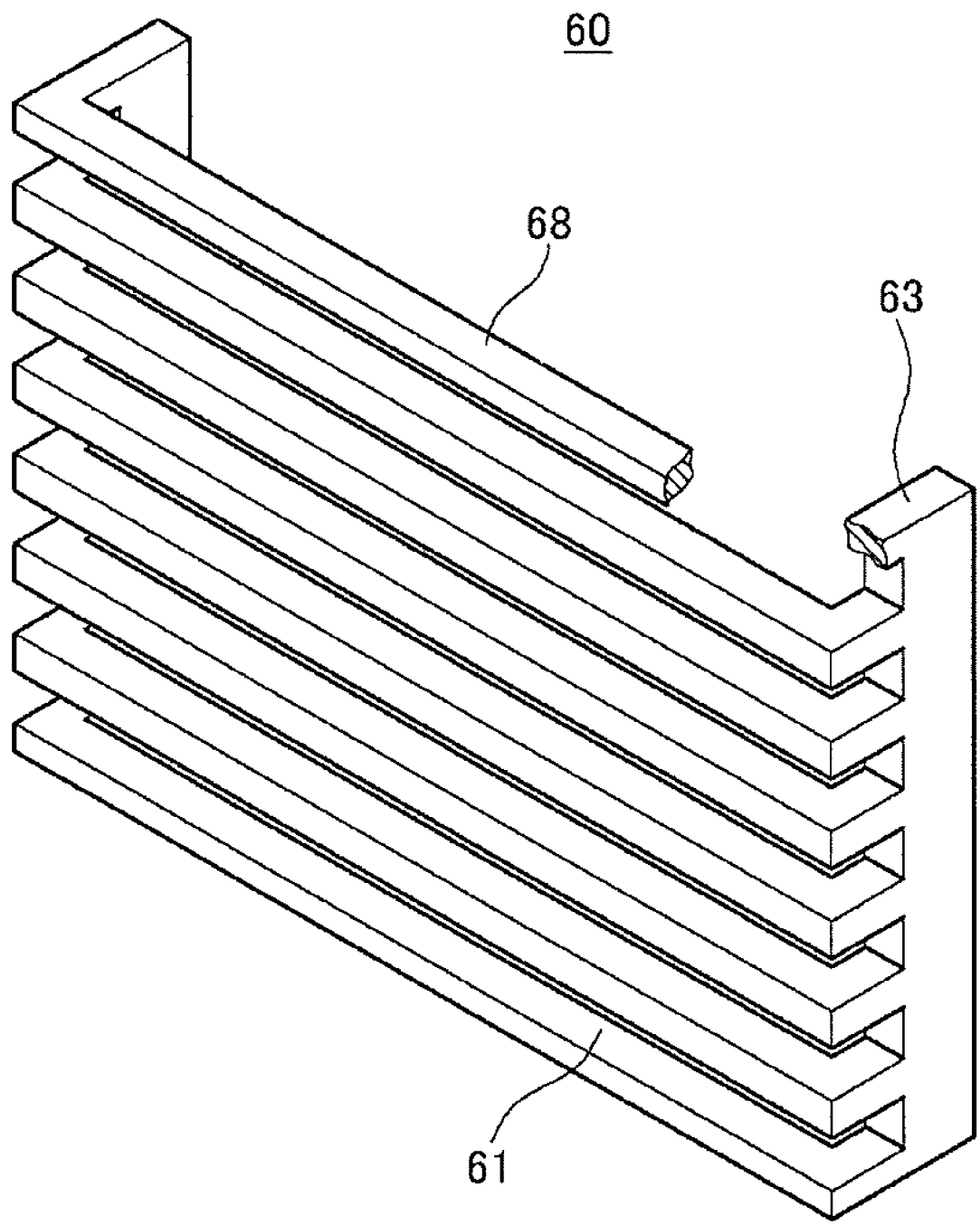
FIG. 6 is a perspective view showing the cell barrier of FIG. 5.

FIG. 5 illustrates a battery module 200 in accordance with a second embodiment of the present invention, and FIG. 6 is a perspective view depicting the cell barrier 60 of FIG. 5.

In the drawings, the unit cells 11, the external terminals 12 formed in the unit cells 11, and the end plates 15 disposed in the outermost sides of the unit cells 11 are the same as those having the same reference numerals in the previously described embodiment.

In the second embodiment, the cell barrier 60 includes plate members 68 having openings 61 and bending elements 63 bent on both edges of the plate member 68.

In other words, the bending elements 63 are formed on both confronting edges of the plate member 68 to tightly contact both edges of the unit cells 11, when the unit cells 11 are arranged to have their external terminals 12 on top of the unit cells 11. Herein, the length of the bending elements 63 corresponds to the thickness of the unit cells 11. The ends of the bending elements 63 tightly contact the cell barrier 60 disposed between the unit cells 11, and the unit cells 11 inserted between the cell barriers 60 are fixed stably.

The plate member 68 includes at least one opening 61 on the surface. The opening 61 extends to connect the bending element 63 on one side to the bending element 63 on the other side. The opening 61 penetrates the center surface of the plate member 68 to have the coolant flow therethrough.

Although FIG. 6 shows a plurality of openings 61 formed in the cell barrier 60, the present invention is not limited to the embodiment shown. It would be sufficient to form at least one opening 61 in the cell barrier 60.

In the embodiment shown in FIG. 6 the openings 61 are formed to penetrate through the plate member 68 to have the coolant directly contact the unit cell 11.

Since the cell barrier 60 includes the openings 61, the coolant can flow through the openings 61. Also, the coolant can efficiently cool down the unit cells 11 by directly contacting the neighboring unit cells 11 on both sides. The space between the openings 61 can be freely adjusted as wide as needed. The narrower the space between the openings 61 is, the higher the heat transferring efficiency becomes due to an increased heat transferring area.

Figure 7:
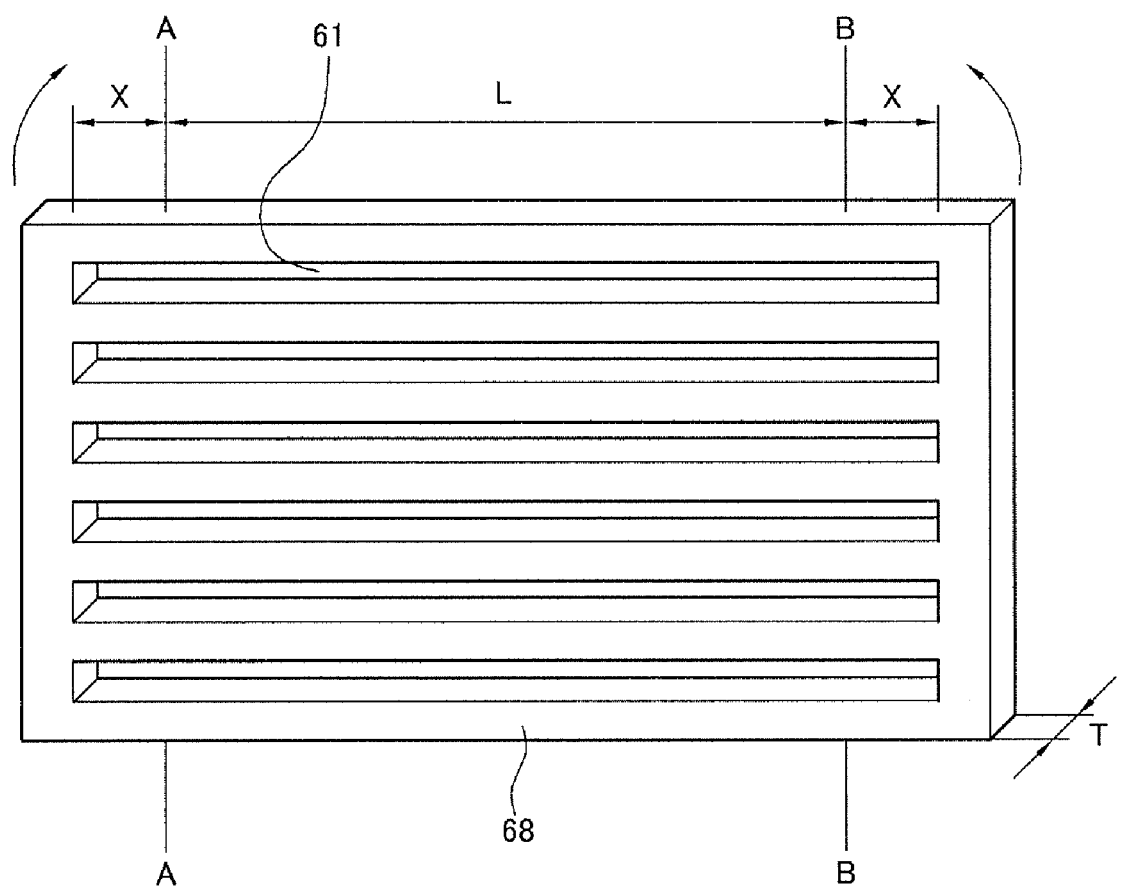
FIG. 7 is a perspective view showing how the cell barrier is fabricated in accordance with the second embodiment of the present invention.

FIG. 7 depicts a process for fabricating the cell barrier 60 in accordance with the second embodiment of the present invention.

First, rectangular openings 61 are formed in the cell barrier 60 by puncturing the plate member 68. The number of the openings 61 is not limited to a specific number as long as it is at least one. The number of the openings 61 is determined based on the size of the unit cells 11 and application environment.

Both edges of the plate member 68 having the openings 61 are then bent in the arrow directions shown based on predetermined axes A and B to thereby form bending elements on both edges of the plate member 68. The edges of the cell barrier 60 may be bent at 90° so that the cell barrier 60 can tightly contact the unit cells 11.

The distance between the axes A and B, corresponds to the front horizontal length of the unit cells 11, when the unit cells 11 are arranged to have their external terminals 12 come on top of the unit cells 11. Thus, the unit cells 11 inserted into the cell barrier 60 tightly contact the unit cells 11, and heat is transferred between the unit cells and the cell barriers 60. As the coolant cools down the cell barriers 60 as well as the unit cells, the cooling efficiency can be maximized.

The openings 61 are further extended to the outside of the axes A and B. A distance X between the axes A and B and the respective side of the openings 61 may be larger than the thickness T of the cell barrier 60 and smaller than the thickness of the unit cells 11.

When the distance X from the axes A and B to a respective side end of the openings 61 is smaller than the thickness of the cell barrier 60, there is a problem that the bent parts close the openings and block free flow of the coolant. When the distance X is larger than the thickness of the unit cells 11, both ends of the openings 61 are open and the cell barrier 60 cannot maintain its shape.

Figure 8:
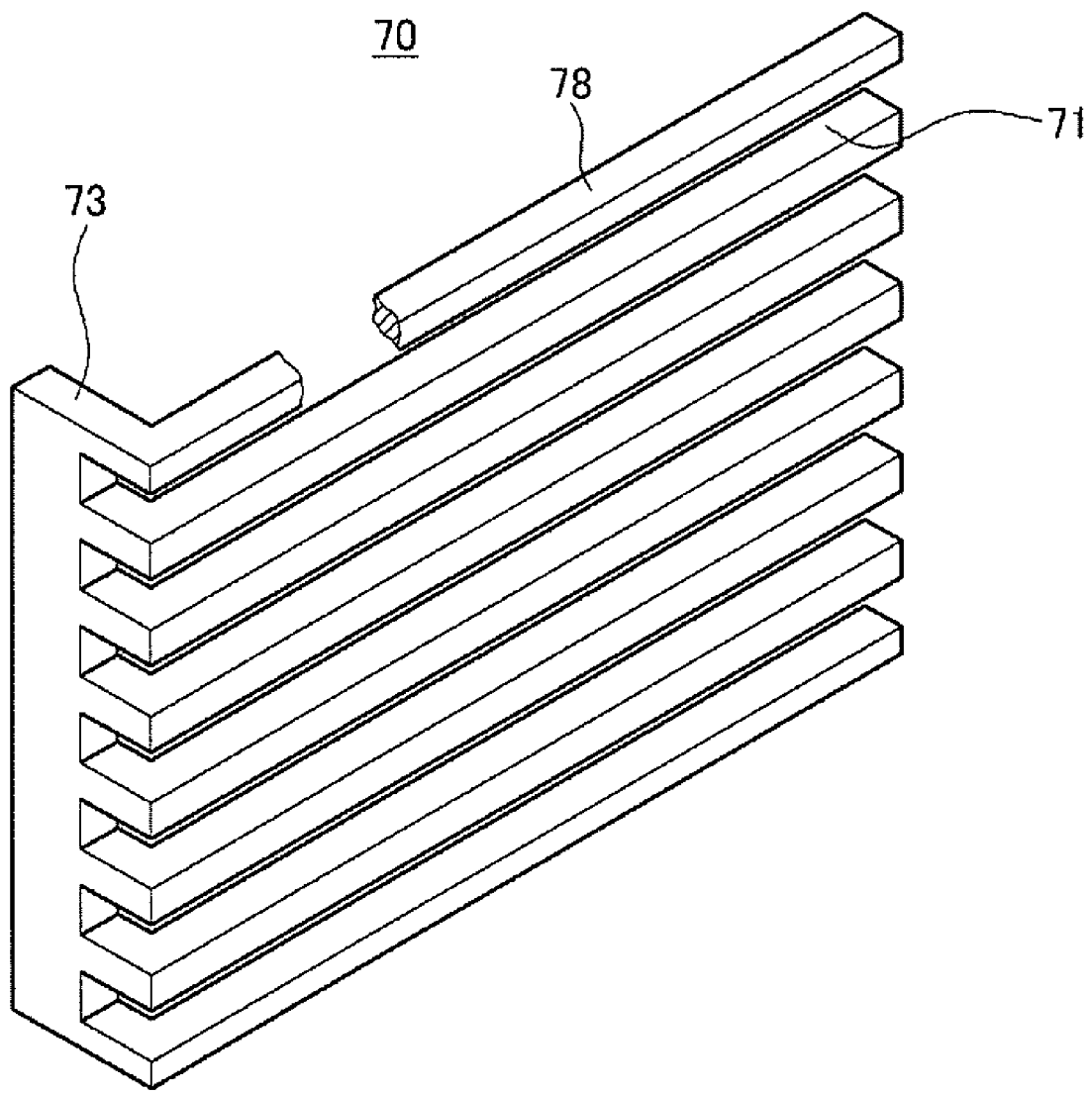
FIG. 8 is a perspective view illustrating a cell barrier of a battery module in accordance with a third embodiment of the present invention.

FIG. 8 is a perspective view illustrating cell barrier of a battery module 70 in accordance with a third embodiment of the present invention.

Only one edge of the plate member 78 of the cell barrier 70 is bent to thereby form a bending element 73.

The bending element 73 is formed in one side of the unit cells 11, when the unit cells 11 are arranged to have their external terminals come on top of the unit cells 11. The bending element 73 is bent at 90° to tightly contact the side of the unit cells 11.

At least one opening 71 is formed in the plate member 78 of the cell barrier 70. The opening 71 is formed long from the bending element 73 in one end to the other end of the plate member 78 of the cell barrier 70. In other words, the opening 71 is formed to penetrate one side of the plate member 78 of the cell barrier 70 that contacts the wide front side of the unit cells 11, and one side of the opening 71 is open.

Thus, the cell barrier 70 is disposed between the unit cells 11, and when the coolant flows through the opening formed in the cell barrier 70, the unit cells 11 disposed between the cell barriers 70 directly contacts the coolant to be cooled down.

Also, since the bending element 73 is formed only in one side of the plate member 78, the volume and weight of the cell barrier 70 is reduced, as compared to a structure where the bending elements are formed in both ends of the plate member 78. As such, the third embodiment can reduce the entire volume and weight of the battery module.

Figure 9:
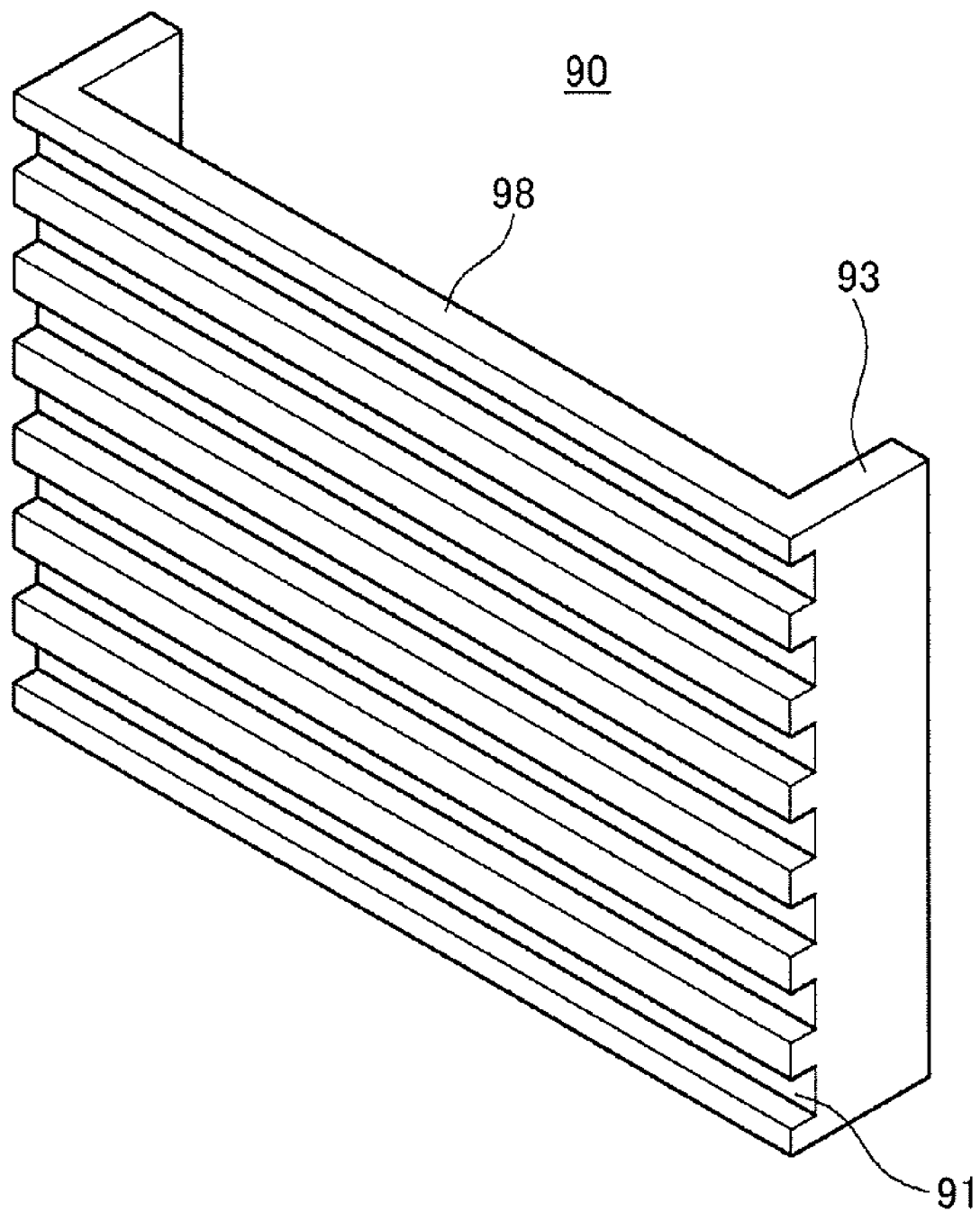
FIG. 9 is a perspective view illustrating a cell barrier of a battery module in accordance with a fourth embodiment of the present invention.

FIG. 9 is a perspective view illustrating a cell barrier 90 of a battery module in accordance with a fourth embodiment of the present invention. An opening 91 formed in the plate member 98 does not penetrate the cell barrier 90 and it is formed in the shape of a groove. Both edges of the plate member 98 are bent to thereby form bending elements 93.

Figure 10:
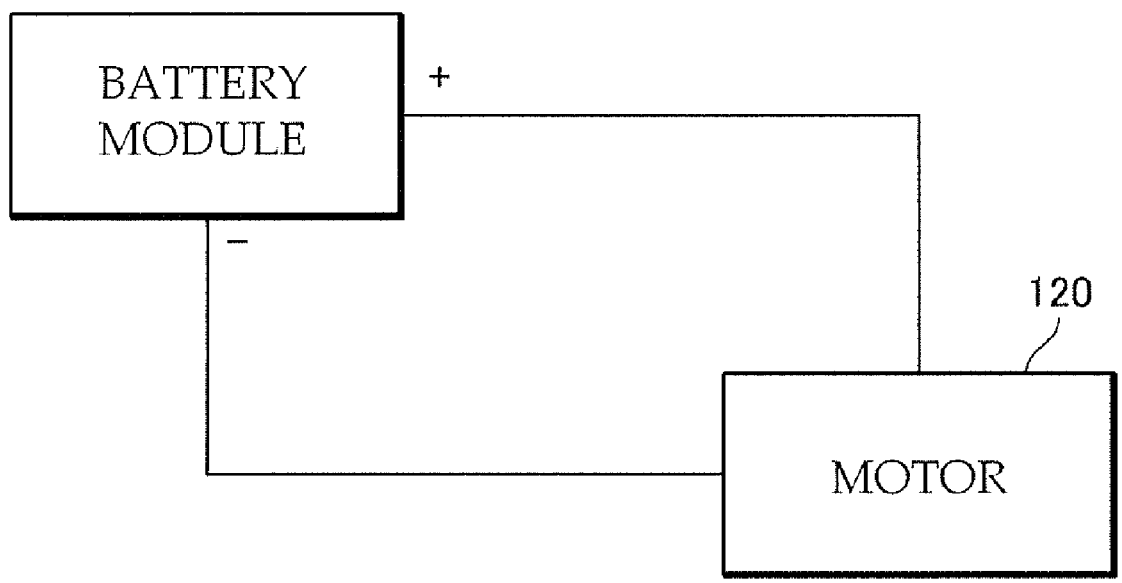
FIG. 10 is a block diagram showing how a battery module which is fabricated in accordance with one of the embodiments of the present invention are electrically connected to operate a motor.

FIG. 10 is a block view showing how a battery module may be connected to a motor 120.

The battery modules of the embodiments of the present invention can be used as a power source for driving a motor of a motor-driven device, such as a hybrid electric automobile (HEV), an electric vehicle (EV), an electric cleaner, and an electric scooter.

As described above, an opening is formed in the cell barrier. The heat transferring efficiency can be improved as the coolant flows through the opening to contact the unit cells and cool down the unit cells.

Since the structure of the cell barrier 90 can be simplified, it is possible to fabricate the battery module easily at a low production cost.

Since the cell barrier includes fixing protrusions and fixing grooves, the cell barrier can be stably fixed in the battery module.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
a plurality of unit cells spaced from one another in a first direction; and
a plurality of cell barriers, each of the cell barriers being adjacent to a respective unit cell of the plurality of unit cells, wherein a cell barrier of the cell barriers comprises:
a body member extending in a second direction and at least partially covering a first outer surface of the adjacent respective unit cell that is facing in the first direction, the body member having an opening extending in the second direction, the second direction being perpendicular to the first direction; and
a bending element extending from a side of the body member in a third direction opposite the first direction and at least partially enclosing a second outer surface of the adjacent respective unit cell, wherein the bending element has an opening extending in the third direction and wherein a length of the opening in the third direction is greater than a thickness of the body member in the third direction,
wherein the opening of the bending element and the opening of the body member together define a coolant flow path extending in the second direction from a first side of the adjacent respective unit cell to a second side of the adjacent respective unit cell opposite the first side.

2. The battery module of claim 1, wherein the bending element comprises a first bending element on a first side of the body member and a second bending element on a second side of the body member, the first and second sides of the body member being opposite sides spaced apart from each other in the second direction.

3. The battery module of claim 2, wherein the opening of the body member extends between the first bending element and the second bending element.

4. The battery module of claim 1, wherein the bending element contacts the second outer surface of the adjacent respective unit cell.

5. The battery module of claim 1, wherein the body member and the bending element are substantially perpendicular to each other.

6. The battery module of claim 1, wherein the opening in the bending element is configured to allow a coolant to contact the second outer surface of the adjacent respective unit cell.

7. The battery module of claim 1, wherein a length of the bending element in the third direction is substantially equal to a thickness of the adjacent respective unit cell in the third direction.

8. The battery module of claim 1, wherein the opening of the body member and the opening of the bending element are continuous with each other.

9. The battery module of claim 1, wherein the opening of the bending element comprises a plurality of openings, each one of the openings being spaced from an adjacent one of the openings by a support member.

10. The battery module of claim 9, wherein the support member extends from a first side of the body member to a second side of the body member.

11. The battery module of claim 1, wherein a height of each of the cell barriers is substantially equal to a height of the adjacent respective unit cell.

12. The battery module of claim 1, wherein each of the cell barriers contacts at least one other of the cell barriers.

13. The battery module of claim 1, further comprising a pair of end plates, each of the end plates located at an opposing end of the plurality of unit cells from another of the end plates.

14. The battery module of claim 13, wherein each of the end plates has a connection opening.

15. The battery module of claim 14, further comprising a connecting member coupled to each of the end plates at the connection opening.

16. The battery module of claim 1, wherein a width of each of the cell barriers in the second direction is greater than a width of the adjacent respective unit cell in the second direction.

* * * * *